(12) United States Patent
Khare

(10) Patent No.: US 8,826,319 B2
(45) Date of Patent: Sep. 2, 2014

(54) METHOD AND SYSTEM FOR TRACKING OF ADVERTISEMENTS

(75) Inventor: Rajendra Kumar Khare, Bangalore (IN)

(73) Assignee: Surewaves Mediatech Private Limited, Bangalore, Karnataka (IN)

( * ) Notice: Subject to any disclaimer, the term of this patent is extended or adjusted under 35 U.S.C. 154(b) by 0 days.

(21) Appl. No.: 13/206,494

(22) Filed: Aug. 9, 2011

(65) Prior Publication Data

US 2013/0191866 A1      Jul. 25, 2013

(51) Int. Cl.
*H04N 7/10*      (2006.01)
(52) U.S. Cl.
USPC ................. 725/22; 725/32; 725/36
(58) Field of Classification Search
CPC ............... H04N 21/812; H04H 20/14
USPC ........................... 725/9–22, 32–36
See application file for complete search history.

(56) References Cited

U.S. PATENT DOCUMENTS

| | | | | |
|---|---|---|---|---|
| 4,967,273 | A * | 10/1990 | Greenberg | 725/22 |
| 2006/0010466 | A1 * | 1/2006 | Swix et al. | 725/32 |
| 2007/0157224 | A1 * | 7/2007 | Pouliot et al. | 725/22 |
| 2010/0017835 | A1 * | 1/2010 | Wilson et al. | 725/114 |
| 2010/0043022 | A1 * | 2/2010 | Kaftan | 725/34 |
| 2010/0153993 | A1 * | 6/2010 | Konig et al. | 725/34 |
| 2011/0078740 | A1 * | 3/2011 | Bolyukh et al. | 725/41 |
| 2011/0145857 | A1 * | 6/2011 | Agarwal et al. | 725/32 |

* cited by examiner

*Primary Examiner* — Benjamin R Bruckart
*Assistant Examiner* — Akshay Boshi
(74) *Attorney, Agent, or Firm* — Barry Choobin; Patent360 LLC

(57) ABSTRACT

A system and method for tracking of advertisements. The system includes a user interface for accessing information associated with commercial breaks and advertisements. The system also includes one or more edge devices for recording advertisements aired during commercial breaks on a television or radio channel. Further, the system includes a media server. The media server includes a memory, and a processor for storing recorded advertisements along with a stamp of region, channel, program and time of insertion associated with the advertisements in a repository of a media server, and providing access to the recorded advertisements for the advertisers. The method includes recording advertisements aired during commercial breaks on the television or the radio channel, storing recorded advertisements along with a stamp of region, channel, program and time of insertion associated with the advertisements in a repository of a media server, and providing access to the recorded advertisements for the advertisers.

8 Claims, 3 Drawing Sheets

METHOD AND SYSTEM FOR TRACKING OF ADVERTISEMENTS

This application claims priority from Indian Provisional Application Serial No. 2287/CHE/2010 filed on Aug. 9, 2010 entitled "METHOD AND SYSTEM FOR TRACKING OF ADVERTISEMENTS", which is hereby incorporated in its entirety.

TECHNICAL FIELD

Embodiments of the disclosure relate to the field of advertising and more specifically to the field of advertising on television and radio.

BACKGROUND

Advertisement (Ad) tracking is also known as post-testing or ad effectiveness tracking. Generally Ad tracking is in-market research that monitors a brand's performance including brand and advertising awareness, product trial and usage, and attitudes about the brand versus their competition.

Since the researcher has information on when the ads launched, the length of each advertising flight, the dollars spent, and when the interviews were conducted, the results of ad tracking can provide information on the effects of advertising.

The purpose of ad tracking is generally to provide a measure of the combined effect of the media weight or spending level, the effectiveness of the media buy or targeting, and the quality of the advertising executions or creative.

Advertisers use the results of ad tracking to estimate the return on investment (ROI) of advertising, and to refine advertising plans. Sometimes, tracking data are used to provide inputs to Marketing Mix Models which marketing science statisticians build to estimate the role of advertising, as compared to pricing, distribution and other marketplace variables on sales of the brand.

Today, most ad tracking studies are conducted via the Internet. Some ad tracking studies are conducted continuously and others are conducted at specific points in time (typically before the advertising appears in market, and then again after the advertising has been running for some period of time). The two approaches use different types of analyses, although both start by measuring advertising awareness. Typically, the respondent is either shown a brief portion of a commercial or a few memorable still images from TV ads. Other media typically are cued using either branded or de-branded visual of the ads.

In television or the radio space, it is a huge challenge to keep track of the actual insertion of advertisements and correlate the same with payment process. The problem of tracking can become even more complicated when the insertion of advertisements is done differently at different regions. There is a need of a solution to automate the process of recording of only commercial breaks at each of the regions.

In the light of the foregoing discussion there is a need for a system and a method for tracking of advertisements.

SUMMARY

The above-mentioned needs are met by a system and a method for tracking of advertisements.

An example of a system includes a user interface for accessing information associated with commercial breaks and advertisements. The system also includes one or more edge devices for recording advertisements aired during commercial breaks on a television or radio channel. Further, the system includes a media server. The media server includes a memory that stores instructions. The media server also includes a processor responsive to the instructions to store recorded advertisements along with a stamp of region, channel, program and time of insertion associated with the advertisements in a repository of a media server, and provides access to the recorded advertisements for the advertisers.

An example of a method for tracking of advertisements includes recording advertisements aired during commercial breaks on a television or radio channel. The method also includes storing recorded advertisements along with a stamp of region, channel, program and time of insertion associated with the advertisements in a repository of a media server. Further, the method includes providing access to the recorded advertisements for the advertisers. Furthermore, the method includes streaming of the recorded advertisements or live streaming of the television or radio feeds including the advertisements to facilitate $3^{rd}$ party monitoring.

DETAILED DESCRIPTION OF THE EMBODIMENTS

The above-mentioned needs are met by a system and a method for tracking of advertisements into a television or radio channel. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
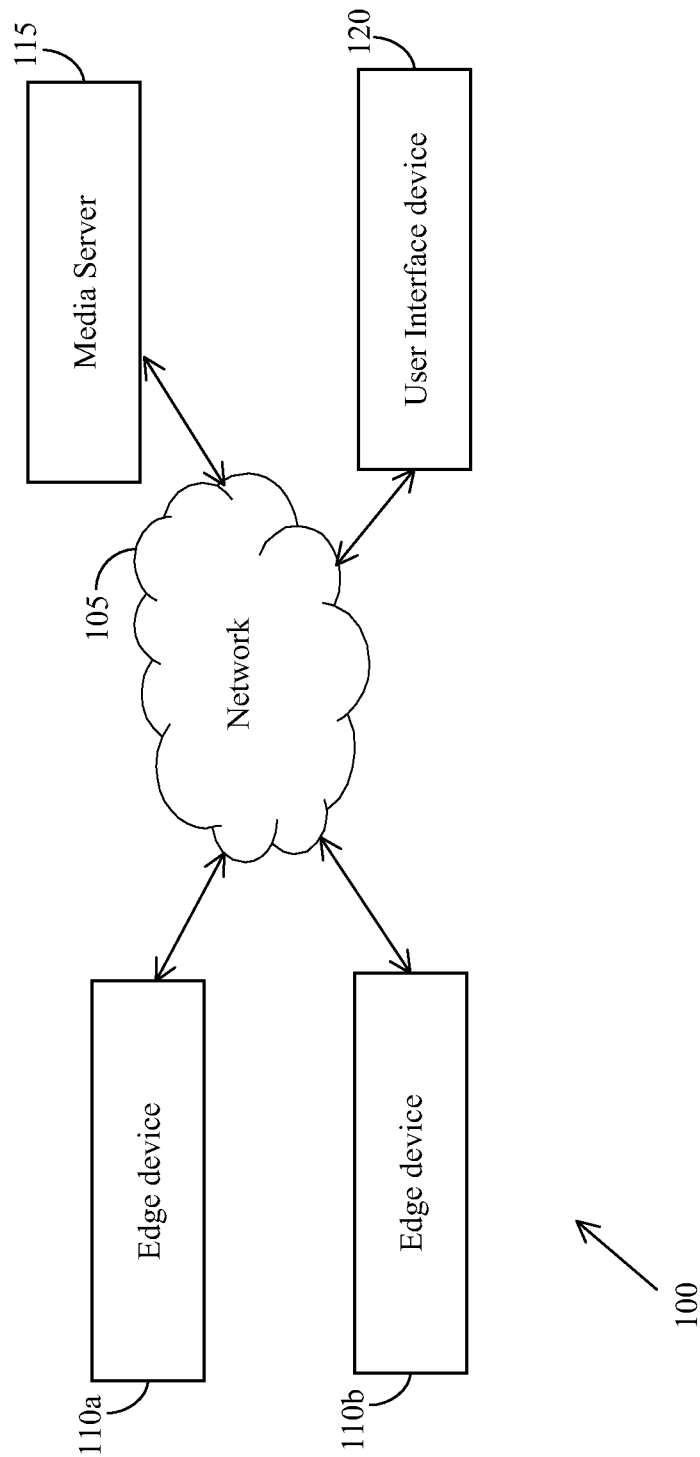
FIG. 1 is a block diagram of an environment, in accordance with which various embodiments can be implemented.

FIG. 1 is a block diagram of an environment 100, in accordance with which various embodiments can be implemented.

The environment 100 includes one or more edge devices, for example an edge device 110a and an edge device 110b connected to the network 105. The environment 100 also includes a user interface device 120 connected to the network 105. Examples of the user interface device 120 include, but are not limited to, computers, mobile devices, laptops, palmtops, hand held devices, telecommunication devices and personal digital assistants (PDAs). The environment 100 also includes a media server 115 connected to the network 105.

The media server 115 is in electronic communication with the edge device 110a, the edge device 110b and the user interface device 120 through the network 105. Examples of the network 105 include, but are not limited to, a Local Area Network (LAN), a Wireless Local Area Network (WLAN), a Wide Area Network (WAN), internet, and a Small Area Network (SAN). The media server 115 can be located remotely with respect to the one or more edge devices and the user interface device 120.

The media server 115 in conjunction with the edge devices can be regarded as a platform for tracking of advertisements. The media server 115 further includes a combination of one or more advertisement servers and one or more content servers that may be connected to the media server 115 locally or remotely over the network 105. The one or more advertisement servers are used to store multiple advertisements. The one or more content servers are used to store various television or radio contents that can be aired on various television or radio channels respectively. The media server 115 is also operable to store user profiles and media plans associated with users. Further, the media server 115 stores recorded advertisements. The media server 115 can be laid on a cloud network for providing increased scalability, availability and accessibility. The media server 115 can also be used by the advertisers to keep track of advertisements aired on the television or the radio channel. The advertisements, for example a national advertisement or a regional advertisement, aired can be recorded by the edge device 110*a* and sent for storage to media server 115. Hence the media server 115 serves as an intelligent interface for the advertisers to track the advertisements aired on the television or the radio channel and meet auditing requirements.

The edge device 110*a* and the edge device 110*b* are connected to the media server 115 through the network 105 to fetch one or more advertisements specific to the advertiser from the media server 115. The edge device 110*a* can also fetch the television or the radio contents from a broadcasting studio. The edge device 110*a* can further integrate the one or more advertisements and the television or radio contents within a central network feed that is generated at the broadcasting studio. In addition, the edge device 110*a* is operable to recognize the start and end of a commercial break or each of the individual advertisements by way of detecting pre-determined audio cue tones or image patterns that are embedded within the advertisements and perform atleast one of recording and streaming of the advertisements, or the television or radio feed.

The edge device 110*a* and the edge device 110*b* can be deployed in one or more distributing stations. Examples of distributing stations include, but are not limited to, central studio, regional Multiple System Operators (MSO) head ends, LCO distribution points, Direct to Home (DTH) up-linking centers, FM Radio Stations and Local Community Radio Stations.

The user interface 120 is used by the advertiser for accessing information associated with commercial breaks and the advertisements. The advertiser can access the recorded advertisements along with a stamp of region, channel, program and time of insertion associated with the advertisements. The information is provided by the media server 115. The user interface 120 can also be used to input profiles associated with advertisers.

Figure 2:
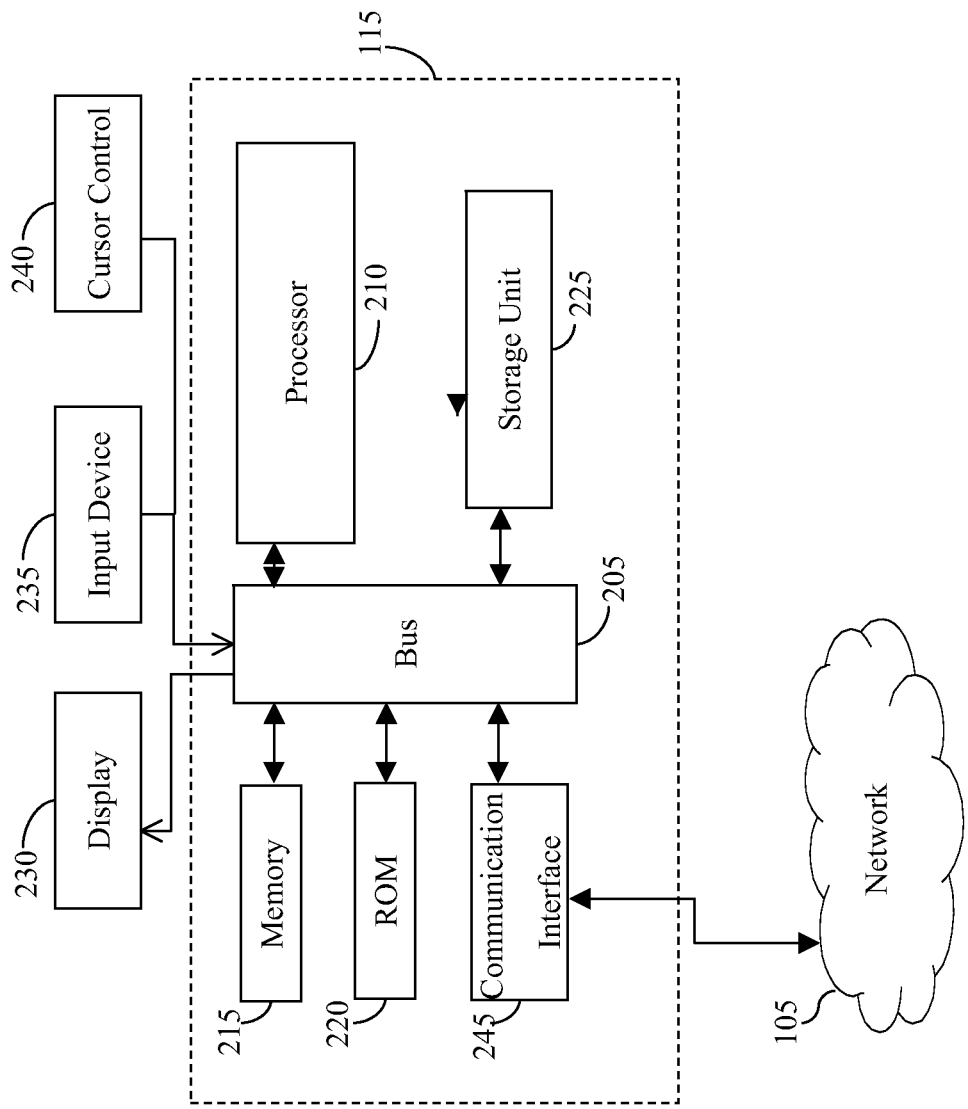
FIG. 2 is a block diagram of a media server for tracking of advertisements, in accordance with an embodiment.

The media server 115 including a plurality of elements is explained in detail in conjunction with FIG. 2.

FIG. 2 is a block diagram of a media server for tracking of advertisements, in accordance with an embodiment.

The media server 115 includes a bus 205 or other communication mechanism for communicating information, and a processor 210 coupled with the bus 205 for processing information. The media server 115 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The media server 115 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example information associated with a one or more types of advertisement, various television or radio contents, a list of television or radio channels, timestamps for commercial breaks, recorded advertisements, and stamp of region, channel, program and time of insertion associated with the recorded advertisements.

The media server 115 can be coupled via the bus 205 to a display 230, for example a cathode ray tube (CRT), for displaying the one or more targeted advertisement. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the media server 115 for implementing the techniques described herein. In some embodiments, the techniques are performed by the media server 115 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the media server 115, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 205. Transmission media can also take the form of acoustic or light waves, such as those generated during radio-wave and infra-red data communications. Examples of machine-readable media may include, but are not limited to, a carrier wave as described hereinafter or any other media from which the media server 115 can read. For example, the instructions can initially be carried on a magnetic disk of a remote computer. The remote computer can load the instructions into its dynamic memory and send the instructions over a telephone line using a modem. A modem local to the media server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The media server 115 also includes a communication interface 245 coupled to the bus 205. The communication interface 245 provides a two-way data communication coupling to the network 105. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The edge device 110a or the edge device 110b described in FIG. 1 record advertisements aired during the commercial breaks on a television or radio channel. The recorded advertisements are sent to the media server 115. The processor 210 in the media server 115 stores the recorded advertisements along with a stamp of region, channel, program and time of insertion associated with the advertisements in the storage unit 225 (repository). Further, the processor provides access to the recorded advertisements for the advertisers. The advertisers can access the recorded advertisements, proof of play reports and information associated with recorded advertisements using the user interface 120 described in FIG. 1.

The edge device 110a, the edge device 110b and the user interface 120 can also include a plurality of elements similar to the elements of the media server 115 described in FIG. 2 for performing various functions for tracking of advertisements.

Figure 3:
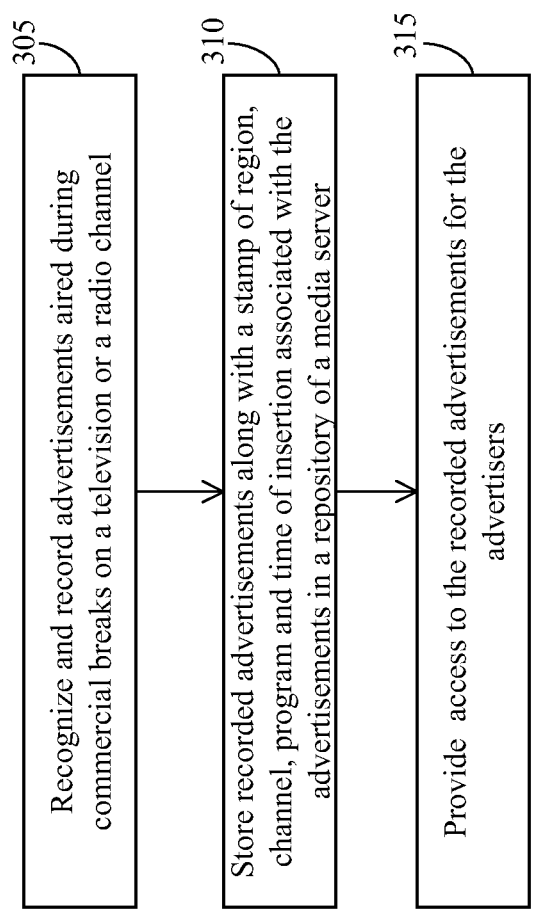
FIG. 3 is a flowchart illustrating a method for tracking of advertisements, in accordance with an embodiment.

FIG. 3 is a flowchart illustrating a method for tracking of advertisements, in accordance with an embodiment.

Advertisers buy airtime from television or radio networks (broadcast networks) in one or more television channels or radio channels for marketing their products during commercial breaks. The television or the radio networks manage insertion of the advertisements by means of elements described in environment of FIG. 1. The advertisements that are to be aired on the television or the radio channels are sent to the media server 115. The media server in turn schedules insertion of the advertisements. The actual insertion is then performed by the edge devices. The edge devices can be deployed in one or more distributing stations. Examples of distributing stations include, but are not limited to, central studio, regional Multiple System Operators (MSO) head ends, LCO distribution points, Direct to Home (DTH) up-linking centers, FM Radio Stations and Local Community Radio Stations. The edge devices can also be known as media stations.

At step 305, advertisements aired during commercial breaks on the television or the radio channel is recorded by the edge devices. The edge devices are located at the distribution stations and hence can record the advertisements that are broadcasted in multiple regions.

The advertisements are recorded by the one or more edge devices on identifying a start and end of the commercial breaks and each individual advertisement during the commercial breaks. The start and end of the commercial breaks or the advertisements are detected using one of pre-determined audio cue tones and image patterns embedded within the advertisements.

The edge devices also record information such as a stamp of region, channel, program and time of insertion when the advertisements are aired.

In one embodiment, recorded advertisements are received by the media server 115 from the edge devices.

In another embodiment, the recorded advertisements can be streamed on the fly over the network 105 for third party monitoring.

In yet another embodiment, a live streaming of a television or radio feed including the advertisements are also provided over the network 105 by the edge devices.

At step 310, the recorded advertisements along with the stamp of region, the channel, the program and time of insertion associated with the advertisements are stored in a repository (storage unit 225) of a media server 115.

In an embodiment, a low resolution video of the recorded advertisement is stored in the repository of the media server 115.

At step 315, access to the recorded advertisements is provided for the advertisers. The advertisers can access the recorded advertisements using the user interface 120.

The media server 115 can also generate online proof of play reports for the advertisements aired on the television or the radio channel.

In some embodiments, the media server 115 in conjunction with the edge devices tracks audio advertisements inserted into the radio channel.

The system specified in the present disclosure enables an automated method for tracking of advertisements inserted into a feed of television or radio channel. A recording of the advertisements aired on the television or the radio channel is stored in the system. The system also serves as an intelligent interface for advertisers to keep track of their advertisements in different regions and meet auditing requirements. Further, the system can also generate online proof of play reports for the advertisements. Furthermore, the system provides for third party monitoring of the television or the radio feeds displaying advertisements on television or the radio channels respectively. The system can also be placed on a cloud network providing for high scalability, availability and accessibility. The system is also extensible to insertion of audio advertisements into the radio channel.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A system for tracking of advertisements, the system comprising:
    providing a user interface to an advertiser a user interface for accessing information associated with commercial breaks and advertisements;
    one or more edge devices for recording advertisements aired during commercial breaks on a television channel in each region, and wherein the one or more edge devices records the advertisements on identifying a start and end of the commercial breaks and start at the end of each individual advertisement during the commercial breaks, and wherein the one or more edge devices is used to insert video advertisements during the commercial breaks, and wherein a start and an end of the advertisement are detected using one of pre-determined audio cue tones and image patterns embedded within the advertisements, and wherein the one or more edge devices is further operable to perform streaming of the recorded advertisements on the fly;
    a media server comprising:
    a memory that stores instructions; and
        a processor responsive to the instructions to store recorded advertisements along with a stamp of region, channel, program and time of insertion associated with the advertisements in a repository of a media server, and provide access to the recorded advertisements for the advertisers;
        wherein the media server is laid on a cloud network; and
        wherein the media server further includes a combination of one or more advertisement servers and one or more content servers that are connected to the media server locally or remotely over a network, and wherein the one or more advertisement servers are used to store a multiple advertisements, and wherein the one or more content servers are used to store various television or radio contents that are aired on various television or radio channels respectively, and wherein the media server is also operable to store user profiles and media plans associated with users.

2. The system as claimed in claim 1, wherein the one or more edge devices are deployed on a plurality of distribution stations.

3. The system as claimed in claim 1, wherein the system tracks audio advertisements on a radio channel.

4. The system as claimed in claim 1, wherein the processor is further responsive to the instructions to generates online proof of play reports for the advertisements aired during the commercial breaks on the television and the radio channel.

5. A method for tracking of advertisements, the method comprising steps of:
    recording advertisements aired during commercial breaks on a television channel, and wherein the recording is performed in each region using a remotely located edge device, wherein the remotely located edge devices records the advertisements on identifying a start and end of the commercial breaks and start at the end of each individual advertisement during the commercial breaks, and wherein the remotely located edge devices is used to insert video advertisements during the commercial breaks, wherein a start and an end of the advertisement are detected using one of pre-determined audio cue tones and image patterns embedded within the advertisements, and wherein the remotely located edge device is further operable to perform streaming of the recorded advertisements on the fly, and wherein a live streaming of a television feed including the advertisements is performed for third party monitoring;
    storing recorded advertisements along with a stamp of each region, channel, program and time of insertion associated with the advertisements in a repository of a media server, and wherein the media server is laid on a cloud network, wherein said media server further includes a combination of one or more advertisement servers and one or more content servers that are connected to the media server locally or remotely over a network, and wherein the one or more advertisement servers are used to store a multiple advertisements, and wherein the one or more content servers are used to store various television or radio contents that are aired on various television or radio channels respectively, and wherein the media server is also operable to store user profiles and media plans associated with users; and
    providing access to the recorded advertisements for the advertisers via a user interface.

6. The method as claimed in claim 5, wherein a low resolution video of the recorded advertisement is stored in the repository of a media server.

7. The method as claimed in claim 5, and further comprises generating online proof of play reports for the advertisements aired during the commercial breaks on the television channel.

8. The method as claimed in claimed 5, wherein the method is performed for tracking of advertisements on a radio channel.

* * * * *